United States Patent [19]
Dlugos

[11] Patent Number: 5,777,746
[45] Date of Patent: Jul. 7, 1998

[54] APPARATUS AND METHOD FOR DIMENSIONAL WEIGHING UTILIZING A MIRROR AND/OR PRISM

[75] Inventor: Daniel F. Dlugos, Shelton, Conn.

[73] Assignee: Pitney Bowes Inc., Stamford, Conn.

[21] Appl. No.: 775,674

[22] Filed: Dec. 31, 1996

[51] Int. Cl.$^6$ .................................................. G01B 11/02
[52] U.S. Cl. ........................... 356/380; 356/72; 356/372; 356/383; 356/387; 250/559.21; 250/559.24; 250/559.26
[58] Field of Search .......................... 356/72, 372, 379, 356/380, 383, 384, 387; 250/559.19, 559.21, 559.24, 559.26

[56] References Cited

U.S. PATENT DOCUMENTS

| | | | |
|---|---|---|---|
| 4,528,651 | 7/1985 | Brock | 367/99 |
| 4,857,748 | 8/1989 | Takiguchi | |
| 4,996,440 | 2/1991 | Nordbryhn | |
| 5,004,929 | 4/1991 | Kakimoki et al. | |
| 5,102,223 | 4/1992 | Uesugi | 356/376 |
| 5,325,178 | 6/1994 | Louis et al. | 356/381 |
| 5,331,118 | 7/1994 | Jensen | 177/25.14 |
| 5,488,478 | 1/1996 | Bullock et al. | 356/376 |
| 5,519,492 | 5/1996 | Holzapfel et al. | 356/356 |
| 5,519,675 | 5/1996 | Toofan | 369/13 |
| 5,523,835 | 6/1996 | Kaisha | 365/5.05 |
| 5,523,884 | 6/1996 | Jewell | 359/641 |
| 5,534,992 | 7/1996 | Takeshima et al. | 356/5.1 |
| 5,606,534 | 2/1997 | Stringer et al. | 367/128 |

FOREIGN PATENT DOCUMENTS

WO 94/20933  9/1994  WIPO .

Primary Examiner—F. L. Evans
Attorney, Agent, or Firm—Melvin Scolnick; Robert H. Whisker; David E. Pitchenik

[57] ABSTRACT

The invention is a method and apparatus for measuring the dimensions of a parcel. The invention begins by placing a parcel in a corner of a field of measurement comprising a flat surface which is preferably a weighing scale, and meeting two upright adjacent walls; each of the walls have at their base a corresponding calibrated reflective strip. A laser scanner emitter is activated and directs a beam toward a rotating polygonal mirror, so as to deflect the beam towards a parabola which further deflects the beam across the reflective strip of the first wall, across the parcel, and then across the second wall. The beam is reflected from the reflective tape back toward the parabola and, back toward the polygonal mirror and on to the emitter scanner. Upon receiving the returned beam, the emitter scanner will record a pattern of reflected light which is demonstrative of the location of the parcel within the field of measurement. The recorded pattern of reflected light is transmitted to a data processing system which calculates the length and the width of the parcel by comparing the pattern to a data table located in the data processing system. After recording the reflected light indicative of the height and width, the rotating polygonal mirror is raised, under control of the data processing device, so as to redirect the beam upward so as to determine a height for the parcel.

13 Claims, 2 Drawing Sheets

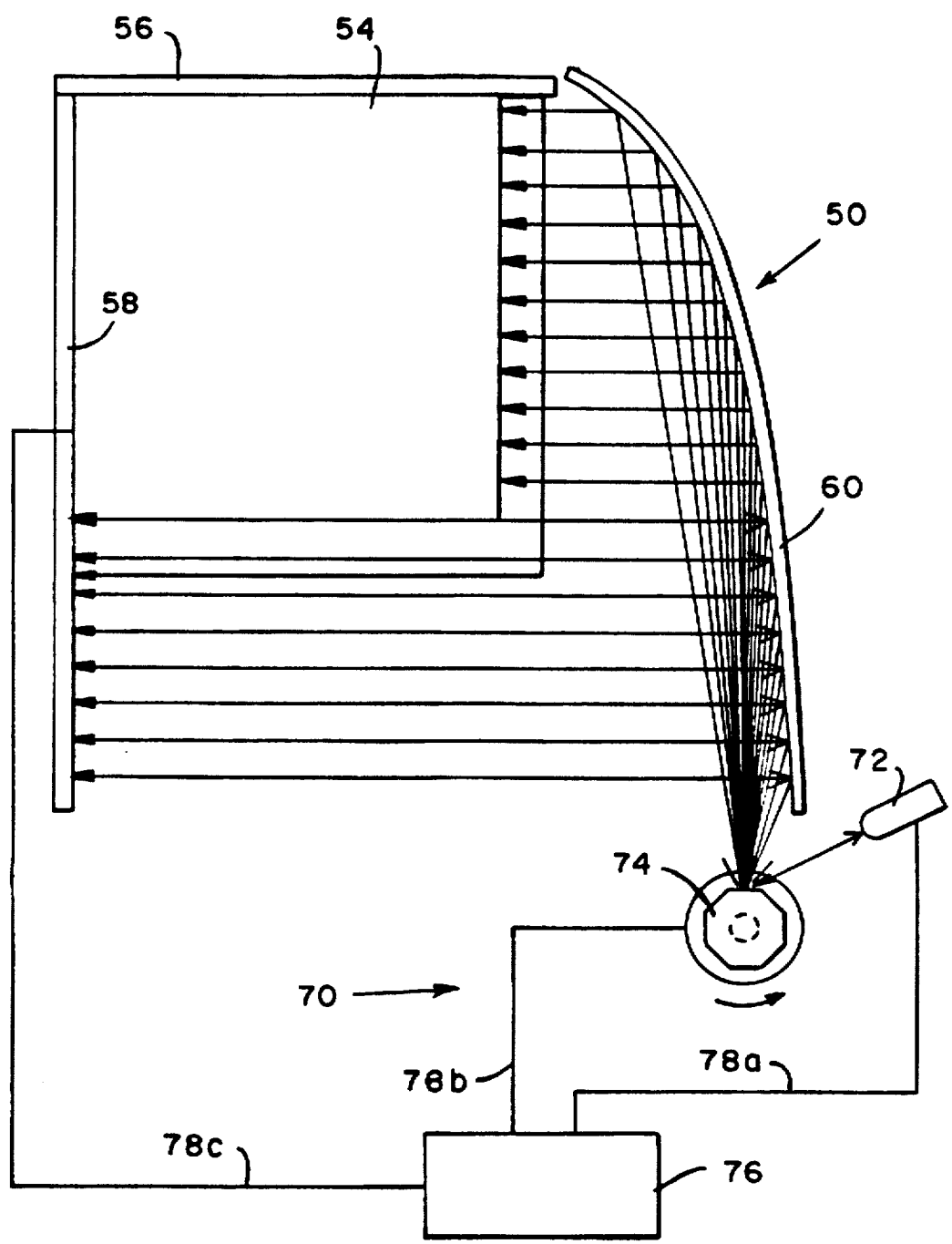

5,777,746

APPARATUS AND METHOD FOR DIMENSIONAL WEIGHING UTILIZING A MIRROR AND/OR PRISM

RELATED APPLICATIONS

Reference is made to application Ser. No. 08,775,850 entitled APPARATUS AND METHOD FOR DIMENSIONAL WEIGHING UTILIZING A LASER SCANNER, assigned to the assignee of this application and filed on Dec. 31, 1996.

Reference is made to application Ser. No. 08,775,672 entitled METHOD FOR DIMENSIONAL WEIGHING UTILIZING POINT DETERMINATION, assigned to the assignee of this application and filed on Dec. 31, 1996.

Reference is made to application Ser. No. 08,775,673 entitled METHOD FOR DIMENSIONAL WEIGHING UTILIZING SPACED LINE PROJECTION, assigned to the assignee of this application and filed on Dec. 31, 1996.

Reference is made to application Ser. No. 08,775,671 entitled METHOD FOR DIMENSIONAL WEIGHING WITH OPTICS, assigned to the assignee of this application and filed on Dec. 31, 1996, with a Notice of Allowance, dated Aug. 5, 1997, received thereafter.

Reference is made to application Ser. No. 08,775,549, entitled LOW COST DIMENSIONAL DETERMINING SYSTEM, assigned to the assignee of this application and filed on Dec. 31, 1996.

Reference is made to application Ser. No. 08,775,851, entitled COARSE VOLUME MEASUREMENT WITH INTERLOCK, assigned to the assignee of this application and filed on Dec. 31, 1996.

Reference is made to application Ser. No. 08,775,675, entitled AUTOMATIC DIMENSIONAL WEIGHING, assigned to the assignee of this application and filed on even Dec. 31, 1996.

Reference is made to application Ser. No. 08,775,550, entitled DIMENSIONAL WEIGHING UTILIZING A FOLLOWING ARM MECHANISM, assigned to the assignee of this application and filed on Dec. 31, 1996.

Reference is made to application Ser. No. 08,775,214 entitled DIMENSIONAL WEIGHING UTILIZING A LINEAR DISPLACEMENT TRANSDUCER, assigned to the assignee of this application and filed on Dec. 31, 1996.

Reference is made to application Ser. No. 08,775,213, entitled APPARATUS AND METHOD FOR DIMENSIONAL WEIGHING UTILIZING A ROTATING SENSOR, assigned to the assignee of this application and filed on Dec. 31, 1996.

BACKGROUND OF THE INVENTION

The increased efficiencies brought by the improvements in data processing systems has helped foster increased competition among parcel and package carriers. There has been a great expansion of the services offered to shippers and in the calculation of shipping charges available to both the casual shipper and the high volume shipper. The challenge that carriers face is to develop a method of charging for carrier services that more closely reflects the reality of what shippers actually need in the way of carriage services. The development of certain efficiencies of transport and materials handling together with electronic invoicing and parcel tracking, has created an environment where carriers are now able to offer shippers mixed modes of transport, overnight delivery, better tracking of parcel movement, and discount rates in return for the utilization of labor and cost saving measures such as: bar coding; bulk delivery; pre-sorting; and, dimensional weighing.

One of the efficiencies of operation is the use of dimensional determination. Carriers have a need to accurately determine the amount of capacity required to meet shipping demands. By determining dimensions other than, or in addition to, weight, then shippers can pack goods more efficiently (i.e., build a pallet according to the needs of the transport mode) and carriers can fill a shipping container (ship, rail, truck, air) more efficiently.

Carrier rates based on dimensional determination generally reward shippers for labeling parcels with dimensional characteristics or for separating out those parcels not meeting certain dimensional prerequisites. The technology associated with dimensional determination has proliferated as the requirements have grown. However, the essential movement of packages at a shipper site have remained the same; packages must still move through a prep area where identification labels of varied type are applied to the parcel, and where manifests can be assembled even if they are downloaded elsewhere. Package movement through the prep area is facilitated by chutes, conveyors, rollers, or simply through human intervention with the occasional platform for weighing, measuring, or marking.

Dimensional determination is employed in various manners. U.S. Pat. No. 5,004,929 for an OPTICAL SYSTEM FOR DETECTING THREE-DIMENSIONAL SHAPE; issued Apr. 2, 1991 to Kakinoki et al. (Kakinoki) is an example of dimensional determination designed to fit a specific need. In the case of Kakinoki, for instance, laser optics is employed to detect and measure a three dimensional shape. Kakinoki is important in its use of light power to compare images of items so that quality production can be maintained over a series of measured objects. If the images match, then the quality is maintained. Dimensional determination for shipping, however, is based on comparison of each object to be measured with a pre-existing but separate measuring standard. Kakinoki, on the other hand, compares each object being detected with other objects of its type, to determine a deviation.

U.S. Pat. No. 5,331,118 for a PACKAGE DIMENSIONAL VOLUME AND WEIGHT DETERMINATION SYSTEM FOR CONVEYORS, was issued Jul. 19, 1994 to Soren Jensen (Jensen). Jensen discloses a system for determining the dimensions of a parcel moving on a conveyor belt. The parcel passes over a strip with indicia indicating units of incremental measure to determine a width, and alongside a similar strip to determine height. The length of the parcel is determined by interrupting the path of a photo-electric eye. Weight is determined by using a weigh-in-motion conveyor scale. The Jensen disclosure provides a good example of how parcel handling is enhanced through the use of simple techniques that do not require a profusion of new hardware or cause parcel movement to be inefficient.

The use of incremental measure to determine dimension has, in a general fashion, long been known in the art; but, advancements in the data processing arts have created efficiencies of measure, calculation, and application that are only recently coming into use. For instance, the use of slit light to determine the extent of curvature of surface shape is disclosed in U.S. Pat. No. 5,102,223, issued Apr. 7, 1992 to Uesugi et al. (Uesugi). Uesugi discloses a method and apparatus for projecting slit light onto a curved surface to code that surface for position, time, or light projecting angle and then comparing the resulting image with an image of a non-curved surface to create a composite which is measurable in terms of variance form a norm. While Uesugi provides an excellent means for producing measurable composites, it is not an efficient means for providing dimensional determination of parcels because of the inherent expense, in time and cost, of producing composites.

The use of sound has been employed in several ways in making dimensional determinations. Long a staple of the Naval forces in locating ships, and now commonly utilized for identifying the location of schools of fish, sound waves can be readily measured to determine the location of points relative to a starting or neutral position. An example of the use of sound in determining the linear measurement of objects is U.S. Pat. No. 4,528,651, issued on Jul. 9, 1985 to Brock et al. (Brock). Brock teaches the measurement of objects, preferably cylindrical, by passing the objects through an array of transducers that perform echo ranging to determine length and diameter. Rectangularly shaped objects or parcels would be limited to only the measurements of length and height.

The ability to continuously monitor a field to be measured is known in the art; consider U.S. Pat. No. 5,325,178 for a METHOD OF MEASURING THE DIMENSIONS OF MOVING OBJECTS, issued on Jun. 28, 1994 to Louis et al. (Louis). Louis teaches that the length, width, and height of objects on a conveyor belt can be determined by utilizing fixed position CCD cameras to measure along predefined axes. The disadvantage to Louis is that the measuring devices (i.e., the CCD cameras) are sited along fixed lines, and therefore, objects of varied dimension can not be accurately measured.

Thus, an object of the present invention is to provide a cost effective means for determining the dimensions of a parcel. The ability of the shipper to enjoy reductions in rates from carriers by implementing certain efficiencies in operation, and to do so without slowing work flow or driving up costs, is a distinct advantage to be gained by the system user.

SUMMARY OF THE INVENTION

According to the invention, the object is achieved and the disadvantages of the prior art are overcome by a method and apparatus for measuring the dimensions of a parcel for use in a parcel processing application of a data processing system.

The method of the present invention comprises a series of steps for determining each of the relevant dimensions of the parcel and begins with the placing of a parcel in a corner of a field of measurement. The field of measurement comprises a flat surface which meets two upright adjacent walls at substantially right angles; each of the walls have at their base a corresponding calibrated reflective strip. In the preferred embodiment of the present invention, the flat surface is the weighing surface of a scale capable of calculating a weight of the placed parcel.

A laser scanner emitter is activated wherein the laser scanner emitter is generally disposed in a position directly opposite the angle formed by the meeting of the two upright adjacent walls and outside the field of measurement. The laser scanner emitter emits a beam wherein the beam is directed toward a rotating polygonal mirror, so as to deflect the beam toward a parabola. The parabola is capable of further deflecting the beam first toward one of the two upright adjacent walls and then toward the second wall, and such that the beam will move across the reflective strip of the first wall, across the parcel, and then across the second wall in repeated waves of the beam.

The beam is reflected from the reflective tape back toward the parabola; and, from the parabola, the beam is further reflected back toward the polygonal mirror and on to the emitter scanner. Upon receiving the returned beam, the emitter scanner will record a pattern of reflected light such that the pattern is demonstrative of the location of the parcel within the field of measurement. The recorded pattern of reflected light is transmitted to a data processing system which calculates the length and the width of the parcel by comparing the pattern to a data table located in the data processing system.

After recording the reflected light indicative of the height and width, the rotating polygonal mirror is raised, under control of the data processing device, so as to redirect the beam upward so as to determine a height for the parcel.

The calculated length, width, height, and weight can be displayed on a display or monitor as well as transmitted to a parcel processing application within the data processing system.

The data processing system is responsible for controlling a number of the activities of the present invention. These activities include control of the rotational movement of the emitter scanner, as well as receiving and processing the measurement data that it transmits. In addition to controlling the emitter scanner. The data processing system controls the system's calculator means which determines actual measurements based on a pre-selected data table and conversion algorithms which are known in the optical scanning arts.

BRIEF DESCRIPTION OF THE DRAWINGS

FIG. 2 is a drawing showing the field of measurement, parabola, and system of the present invention that does not utilize motor control for raising the scanner emitter.

DETAILED DESCRIPTION OF THE PREFERRED EMBODIMENTS

Figure 1:
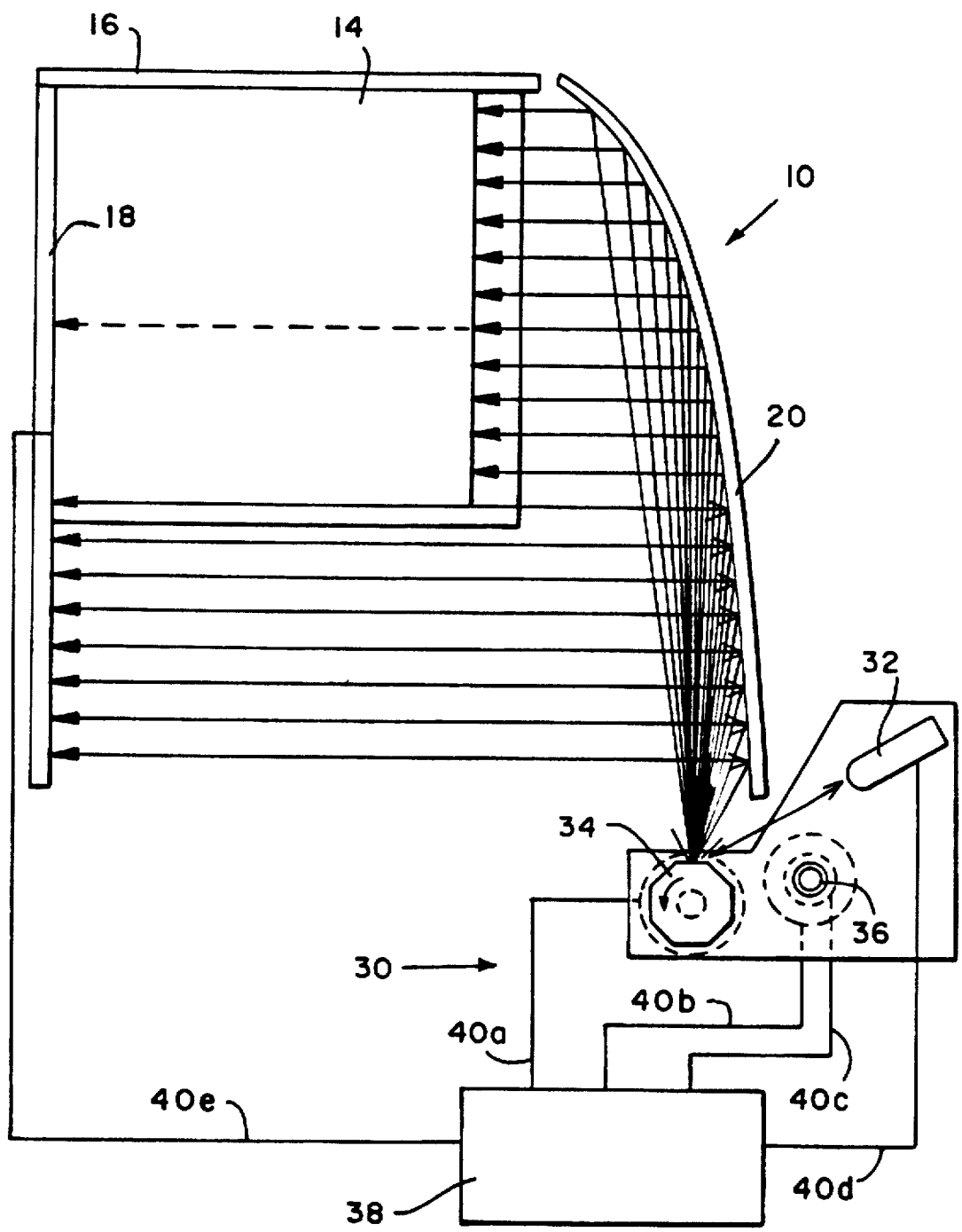
FIG. 1 is a drawing of the preferred embodiment of the present invention showing the field of measurement, parabola, and motor control of the laser scanner.

Turning to FIG. 1, there is shown a preferred embodiment of the present invention comprising a field of measurement 10 and a control subsystem 30.

Field of measurement 10 comprises a platform 14 which is preferably a weighing scale capable of weighing a parcel or other object placed thereupon. The platform, if a weighing scale, is able to transmit data indicative of weight via interface cable 40e to a data processing device 38 (hereinafter CPU 38) which receives the weight data and places the data into a memory for subsequent use by calculating means or by a parcel processing application.

Field of measurement 10 additionally comprises two upright, adjacent walls 16 and 18 that are joined at right angles. Walls 16 and 18 are attached to two corresponding sides of platform 14 and the respective wall surfaces facing platform 14 are coated with a reflective surface that is capable of reflecting a beam of light directed thereupon. Such reflective surfaces are known within the optical art and need not be discussed in detail herein in order to gain an understanding of the present invention.

When a parcel is placed on platform 14, the parcel is placed against wall 16 and against wall 18 so that an accurate measurement of the parcel dimensions can be determined.

Forming one limit of field of measurement 10 is parabola 20 which can be a mirror, prism, or the like capable of reflecting, at an angle, a light beam directed thereupon. Parabola 20 is located to one side of the platform not having an attached wall 16 or 18. The parabola is angled in such a way as to allow a beam to be directed at a 90° angle off of its surface across a range of distance equal to, or greater than the length or width of platform 14 and making contact with wall 18 at at least a slightly greater than 90° angle. The slightly greater than 90° angle is required to reflect the beam to be reflected off of the surface of wall 16 back to the parabola.

Subsystem 30 comprises light beam emitting and receiving means as well as the ability to track and use the data resulting therefrom.

Emitter scanner 32, which can be of a laser scanner type commercially available, is tiltably mounted and under the control of CPU 38 via interface cable 40d, emits a beam of light that is directed onto the surface of rotating polygonal mirror 34. The beam is deflected from rotating polygonal mirror 34 to the surface of parabola 20. The rotation of mirror 34, under control of CPU 38 via interface cable 40a, causes the beam to "walk" the surface of parabola 20. The beam deflects off of the surface of parabola 20 at approximately a 90° angle as it walks across the surface. The beam is directed across platform 14 such that it strikes the reflective surface of wall 18 at least a slightly greater than 90° angle. The slightly greater than 90° angle is required to reflect the beam off of the surface of wall 16 back to the parabola.

The presence of a parcel on platform 14 will cause the beam projected thereacross and in the path of the beam to not be reflected back to the parabola; or, if reflected back, it will be at an intensity that will not meet a threshold standard as determined by CPU 38.

The beam reflecting back to parabola 20 will in turn be reflected back to mirror 34 and then back to emitter scanner 32. Emitter scanner 32 receives the reflected beam as a pattern that represents the field of measurement and the length and width dimensions of a parcel located within the field. The pattern data is transmitted to CPU 38 via interface cable 40d. CPU 38 will store the received data within a memory and use the data to determine the length and width of the parcel by applying the pattern data to a look-up table.

Once pattern data is received from emitter scanner 32, CPU 38 directs motor means 36 via interface cables 40b and/or 40c to raise the base of rotating polygonal mirror 34 to a position at the top of field of measurement 10. As the base is raised, emitter scanner 32 directs a constant beam on rotating polygonal mirror 34 which walks the beam up the surface of the parabola until the beam is reflected back to the parabola from the reflective surface of wall 18. At the point that the light is reflected back to parabola 20, the beam is further reflected back to rotating polygonal mirror 34 and then back to emitter scanner 32. Emitter scanner 32 transmits the received beam as pattern data to CPU 38 which uses the length of beam transmission together with the known speed of the raising of the rotating polygonal mirror's base to determine the height of the parcel. The height of the parcel can be cross-checked by CPU 38 by comparing the determined height of the parcel with the received pattern data as applied to a look-up table that translates received pattern data to dimensional measurement.

The dimensional data derived by CPU 38 can then be used by a parcel processing application resident within the data processing system as required.

Turning to FIG. 2, there is shown a low cost embodiment of the present invention that does not utilize motor means to raise the base of the rotating polygonal mirror. Wile the advantage of this embodiment is cost, its disadvantage is the loss of a means for detecting the height of the parcel. This embodiment would be effective in establishing a threshold two dimensional measure; or manual intervention could rotate the parcel so as to determine the unknown dimension.

In FIG. 2, field of measurement 50 comprises a platform 54 which is preferably a weighing scale capable of weighing a parcel or other object placed thereupon. The platform, if a weighing scale, is able to transmit data indicative of weight via interface cable 78c to a data processing device 76 (hereinafter CPU 76) which receives the weight data and places the data into a memory for subsequent use by calculating means or by a parcel processing application.

Field of measurement 50 additionally comprises two upright, adjacent walls 56 and 58 that are joined at right angles. Walls 56 and 58 are attached to two corresponding sides of platform 54 and the respective wall surfaces facing platform 54 are coated with a reflective surface that is capable of reflecting a beam of light directed thereupon.

When a parcel is placed on platform 54, the parcel is placed against wall 56 and against wall 8 so that an accurate measurement of the parcel dimensions can be determined.

Forming one limit of field of measurement 50 is parabola 60 which can be a mirror, prism, or the like capable of reflecting, at an angle, a light beam directed thereupon. Parabola 60 is located to one side of the platform not having an attached wall 56 or 58. The parabola is angled in such a way as to allow a beam to be directed at a 90° angle off of its surface across a range of distance equal to, or greater than the length or width of platform 54 and making contact with wall 58 at at least a slightly greater than 90° angle. The slightly greater than 90° angle is required to reflect the beam to be reflected off of the surface of wall 56 back to the parabola.

Subsystem 70 comprises light beam emitting and receiving means as well as the ability to track and use the data resulting therefrom.

Emitter scanner 72, which can be of a laser scanner type commercially available, is tiltably mounted and under the control of CPU 76 via interface cable 78a, emits a beam of light that is directed onto the surface of rotating polygonal mirror 74. The beam is deflected from rotating polygonal mirror 74 to the surface of parabola 60. The rotation of mirror 74, under control of CPU 76 via interface cable 78b, causes the beam to "walk" the surface of parabola 60. The beam deflects off of the surface of parabola 60 at approximately a 90° angle as it walks across the surface. The beam is directed across platform 54 such that it strikes the reflective surface of wall 58 at at least a slightly greater than 90° angle. The slightly greater than 90° angle is required to reflect the beam off of the surface of wall 56 back to the parabola.

The presence of a parcel on platform 54 will cause the beam projected thereacross and in the path of the beam to not be reflected back to the parabola; or, if reflected back, it will be at an intensity that will not meet a threshold standard as determined by CPU 76.

The beam reflecting back to parabola 60 will in turn be reflected back to mirror 74 and then back to emitter scanner 72. Emitter scanner 72 receives the reflected beam as a pattern that represents the field of measurement and the length and width dimensions of a parcel located within the field. The pattern data is transmitted to CPU 76 via interface cable 78a. CPU 76 will store the received data within a memory and use the data to determine the length and width of the parcel by applying the pattern data to a look-up table.

The dimensional data derived by CPU 76 can then be used by a parcel processing application resident within the data processing system as required.

As can be appreciated by those skilled in the art, a number of variations of the subject invention are possible. These variations include, but are not limited to: the desired distance between the sensor supporting apparatus and the weighing platform; the mounting means used to mount the peripheral devices in the system; the capabilities of the parcel processing application; the use of varied scanner or detector arrays; and, the use of conveyors of varied ability to propel the parcel into the field of measurement. If a conveyor is used to move parcels through the field of measurement, then the capabilities of the weighing platform will necessarily be altered to accommodate weigh in motion requirements.

It is to be understood that the present invention is not to be considered as limited to the specific embodiment described above and shown in the accompanying drawings, which merely illustrates the best mode presently contemplated for carrying out the invention and which is susceptible to such changes as may be obvious to one skilled in the art, but rather that the invention is intended to cover all such variations, modifications and equivalents thereof as may be deemed to be within the scope of the claims appended hereto.

What is claimed is:

1. A method for measuring the dimensions of a parcel, for use in a parcel processing application of a data processing system, comprising the steps of:
   (a) placing a parcel in a corner of a field of measurement; said field of measurement comprising a flat surface; said flat surface meeting at substantially right angles with two upright adjacent walls; said adjacent walls having at their base a corresponding calibrated reflective strip;
   (b) activating a laser scanner emitter wherein said laser scanner emitter is generally disposed in a position directly opposite said substantially right angles formed by said meeting of said two upright adjacent walls and outside said field of measurement;
   (c) emitting a beam from said laser scanner emitter wherein said beam is directed toward a rotating polygonal mirror;
   (d) rotating said polygonal mirror so as to deflect said beam directed thereupon toward a parabola capable of further deflecting said beam toward a first one of said two upright adjacent walls and then toward a second one of said two upright adjacent walls, and such that said beam moves across said reflective strip located on said one wall, across said parcel, and then across said second wall in continuous waves of said beam;
   (e) reflecting said beam from said corresponding calibrated reflective strip back toward said parabola such that said beam is further reflected back toward said polygonal mirror and to said emitter scanner;
   (f) recording, at said emitter scanner, a pattern of reflected light such that said pattern is demonstrative of the location of said parcel within said field of measurement;
   (g) calculating a length and a width of said parcel by comparing said pattern to a data table located in said data processing system; and
   (h) raising said rotating polygonal mirror's position so as to redirect said beam upward so as to determine a height for said parcel.

2. The method of claim 1, wherein said flat surface is the weighing surface of a scale capable of calculating a weight of said placed parcel.

3. The method of claim 1, wherein said calculated length, width and height are displayed on a display or monitor.

4. The method of claim 1, wherein said calculated length, width and height are transmitted to a parcel processing system.

5. The method of claim 2, wherein said calculated weight is displayed on a display or a monitor.

6. The method of claim 2, wherein said calculated weight is transmitted to said parcel processing application.

7. The method of claim 1, wherein said rotating polygonal mirror is supported on base such that said base can be raised or lowered by motor means under control and direction of said data processing system.

8. An apparatus for measuring the dimensions of a parcel comprising:
   (a) a supporting means for supporting a parcel placed thereupon for measurement;
   (b) a laser scanner means for rotatably scanning a predetermined field for measurement data wherein said measurement data is representative of said parcel's length, said parcel's height, or said parcel's width;
   (c) first reflecting means for reflecting a beam emitted by said laser scanner means towards said field of measurement and for reflecting a return beam to scanning means;
   (d) second reflecting means for reflecting said beam from said field of measurement back to said first reflecting means as said return beam;
   (e) receiving means located at said laser scanner means for scanning said return beam such that a set of data is created from said scanned return beam for transport to data processing means;
   (f) calculator means for calculating said parcel's length, said parcel's height, or said parcel's width from said measurement data; and
   (g) data processing means for:
      (i) controlling rotational movement of said laser scanner means;
      (ii) receiving and processing measurement data from said laser scanner means;
      (iii) transmitting said measurement data to said calculator means to determine actual measurements based on a pre-selected measurement scale;
      (iv) receiving said actual measurements from said calculator means; and
      (v) transmitting said actual measurements to a display means or to a parcel processing system.

9. The apparatus of claim 8 wherein said supporting means is the weighing surface of a scale capable of calculating a weight of said placed parcel.

10. The apparatus of claim 8, wherein said calculated length, width and height are displayed on a display means.

11. The apparatus of claim 8, wherein said calculated length, width and height are transmitted to a parcel processing system.

12. The apparatus of claim 9, wherein said calculated weight is displayed on said display means.

13. The apparatus of claim 9, wherein said calculated weight is transmitted to said parcel processing system.

* * * * *